United States Patent
Thiemann

(10) Patent No.: US 6,740,355 B2
(45) Date of Patent: May 25, 2004

(54) ARTICLE HAVING A NO-SLIP SURFACE AND METHOD OF APPLYING SAME

(75) Inventor: Ronald Thiemann, Cincinnati, OH (US)

(73) Assignee: Knittel Engraving Co. Inc., Miamitown, OH (US)

( * ) Notice: Subject to any disclaimer, the term of this patent is extended or adjusted under 35 U.S.C. 154(b) by 0 days.

(21) Appl. No.: 09/952,393

(22) Filed: Sep. 14, 2001

(65) Prior Publication Data

US 2003/0054121 A1 Mar. 20, 2003

(51) Int. Cl.[7] ............................. B05D 1/36; B05D 1/12
(52) U.S. Cl. ..................... 427/202; 427/180; 427/208.8
(58) Field of Search ........................ 427/208.2, 208.8, 427/181, 201, 202, 203, 204, 205, 230, 239, 191, 195, 282, 384, 385.5, 261, 286–288, 470, 475, 486; 428/143, 204, 206

(56) References Cited

U.S. PATENT DOCUMENTS

| | | | |
|---|---|---|---|
| 4,073,992 A | * | 2/1978 | Lerman et al. |
| 4,518,641 A | | 5/1985 | Shimmin et al. ........... 428/150 |
| 5,098,739 A | | 3/1992 | Sarda ......................... 427/197 |
| 5,997,995 A | | 12/1999 | Scianna ..................... 428/195 |
| 6,013,342 A | | 1/2000 | Neto ........................... 428/40.1 |
| 6,080,310 A | * | 6/2000 | Bolser et al. |
| 6,179,333 B1 | | 1/2001 | Luini et al. .................... 281/37 |
| 6,246,428 B1 | | 6/2001 | Look et al. ................. 347/212 |
| 6,383,558 B1 | * | 5/2002 | Fujiwara et al. |

FOREIGN PATENT DOCUMENTS

JP 11-172897 * 6/1999

OTHER PUBLICATIONS

Marketing Material, Checker Distributors, Aug. 2001.

* cited by examiner

*Primary Examiner*—Fred J. Parker
(74) *Attorney, Agent, or Firm*—Mark F. Smith; Smith Brandenburg + Novak

(57) ABSTRACT

The present direction is directed to an article having a surface which operates as a substrate for receiving a no-slip surface or surface treatment and a method of applying the no-slip surface to the article. In a preferred embodiment of the invention, the no-slip surface is formed from a conventional thermographic powder, such as a granular thermoplastic resin, which is deposited along the substrate. The powdered substrate is then subjected to heat sufficient to melt or soften the powder and adhere it onto the substrate. In another preferred embodiment of the invention, the no-slip surface is formed using a static cling material to provide a removable no-slip surface.

10 Claims, 5 Drawing Sheets

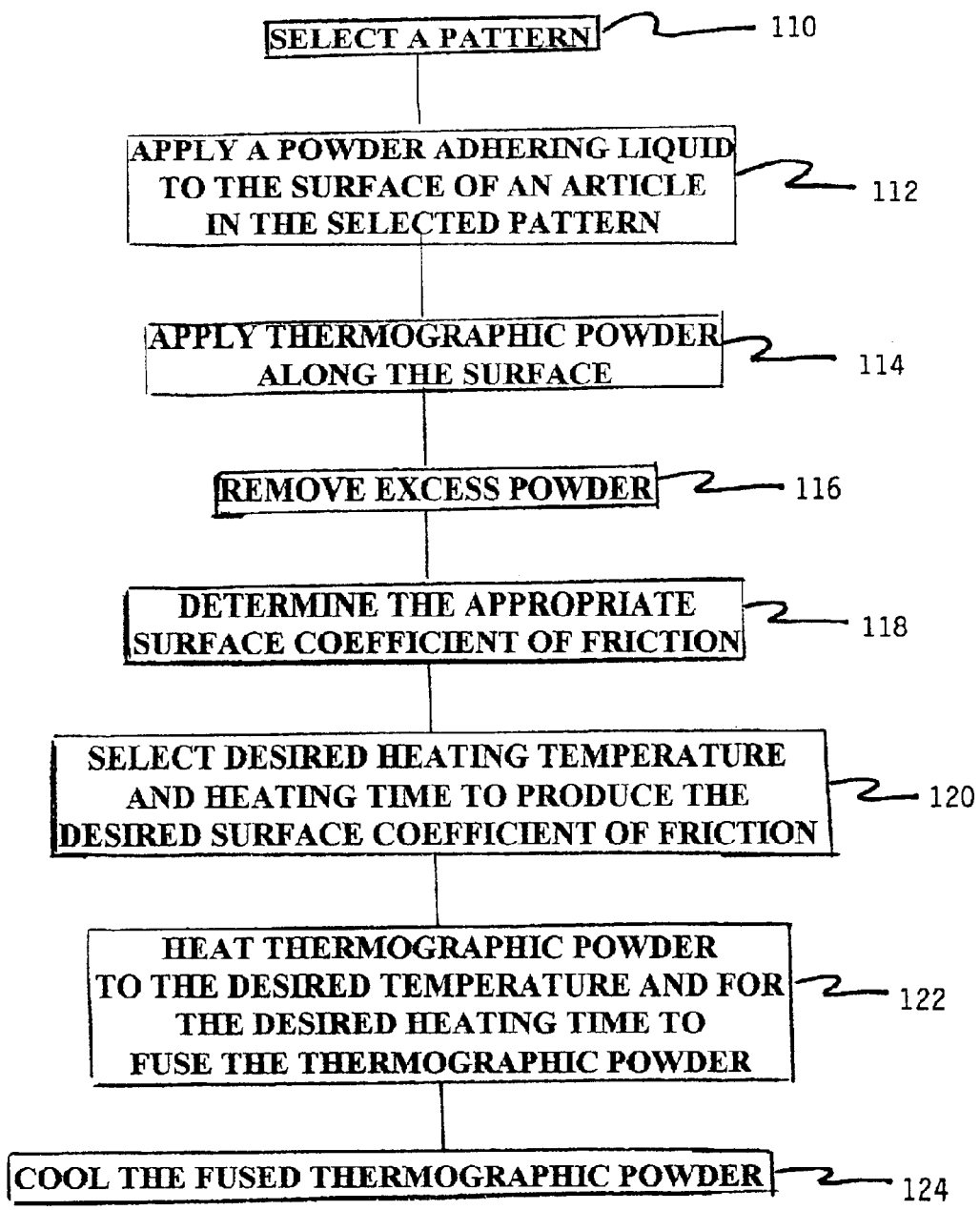

ARTICLE HAVING A NO-SLIP SURFACE AND METHOD OF APPLYING SAME

BACKGROUND OF THE INVENTION

The subject invention is direct to an article having a no-slip surface or surface treatment and, more particularly, to an article having a surface effective for reducing or preventing the article from sliding along a support or secondary surface and a method of applying the surface or surface treatment to the article.

There is a large demand for no-slip surfaces or surface treatments for providing a no-slip surface for a variety of articles. Such demand is especially high for surfaces that can provide a non-slip coefficient of friction while not detrimentally detracting from the appearance of the article. Such articles include, but are not limited to, trays, tray supports, coasters, beverage and food containers, tool handles, and the like. No-slip surfaces have also been used for various tools, such as tools used for measuring or cutting which incorporate the non-slip surface to enable a user to maintain the tool in position during operation.

While numerous no-slip surfaces and surface treatments are known, it has been found that they are often difficult to apply to certain substrate materials, or do not provide an attractive appearance thereby making them unacceptable for many applications. In addition, some applications often require that the no-slip surface be clear or transparent after they are applied to an article. Other materials, such as various types of plastic, such as urethane, while acceptable for certain no-slip surface applications, are relatively expensive and are often cost prohibitive for many applications. Further, many no-slip surfaces typically are difficult to attach to certain substrates due to adhesion difficulties and the potential for foreign material contamination.

Accordingly, a need exists for a no-slip surface or surface treatment for an article that can provide a non-slip coefficient of friction, that can be permanently attached to the article, that can be clear or transparent, that is easily applied, does not detrimentally detracting from the appearance of the article, and which is relatively cost effective for most applications.

SUMMARY OF THE INVENTION

The present invention is directed to an article having a no-slip surface or surface treatment.

In another preferred embodiment of the present invention, the article comprises a measuring device.

In another preferred embodiment of the present invention, the measuring device is a ruler for use in measuring fabric for cutting.

In another preferred embodiment of the present invention, the article comprises a container such as a beverage or food container.

In another preferred embodiment of the present invention, the article comprises a tray.

In another preferred embodiment of the present invention, the article comprises a tray table.

In another preferred embodiment of the present invention, the article comprises a food container for the feeding of animals.

In another preferred embodiment of the present invention, the no-slip surface comprises a fused thermographic powder.

In another preferred embodiment of the present invention, the thermographic powder forms a clear or transparent surface.

In another preferred embodiment of the invention, the thermographic powder comprises colored pigment to form a colored or a colored transparent surface.

In another preferred embodiment of the present invention, the no-slip surface is formed utilizing a thermographic process.

Another preferred embodiment of the invention is a method of applying a no-slip surface or surface treatment utilizing a thermographic process.

In another preferred embodiment of the invention, the thermographic process comprises the step of applying a powder adhering liquid to a surface using a silk-screening process.

In another preferred embodiment of the present invention, the thermographic process comprises the step of selecting the roughness of the no-slip surface which produces the desired surface coefficient of friction and heating the thermographic powder to the proper temperature and for the proper amount of time to form the no-slip surface having the desired surface coefficient of friction.

Another preferred embodiment of the invention the no-slip surface can be easily removed.

Another preferred embodiment of the invention the no-slip surface is removable and is formed from a static cling material.

A primary object of this invention, therefore, is to provide an article having a no-slip surface or surface treatment.

Another primary object of the invention is to provide an article having a no-slip surface which can be attached to a variety of substrate materials.

Another primary object of the invention is to provide an article having a no-slip surface which can be can be permanently attached to the article.

Another primary object of the invention is to provide an article having a transparent no-slip surface.

Another primary object of the invention is to provide an article having a no-slip surface which can be made in various colors.

Another primary object of the invention is to provide an article having a no-slip surface which can be formed in various artistic patterns.

Another primary object of the invention is to provide an article having a no-slip surface which does not detract from the appearance of the article.

Another primary object of the invention is to provide an article comprising a no-slip surface or surface treatment which is relatively cost effective.

Another primary object of the invention is to provide a measuring device having a no-slip surface.

Another primary object of the invention is to provide a ruler for use in measuring fabric for cutting having a no-slip surface.

Another primary object of the invention is to provide a beverage container having a no-slip surface.

Another primary object of the invention is to provide a tray having a no-slip surface.

Another primary object of the invention is to provide a tray table having a no-slip surface.

Another primary object of the invention is to provide a food container having a no-slip surface.

Another primary object of the invention is to provide a food container for the feeding of animals having a no-slip surface.

Another primary object of the invention is to provide a method of applying a no-slip surface to a substrate.

Other objects and advantages of the invention will be apparent from the following description, the accompanying drawings and the appended claims.

BRIEF DESCRIPTION OF THE DRAWINGS

FIG. 2 is a schematic showing the process steps of forming the no-slip surface of FIG. 1;

DETAILED DESCRIPTION OF THE INVENTION

The present invention is directed to an article having a no-slip surface or surface treatment and a method of applying the surface or the surface treatment to the article. Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
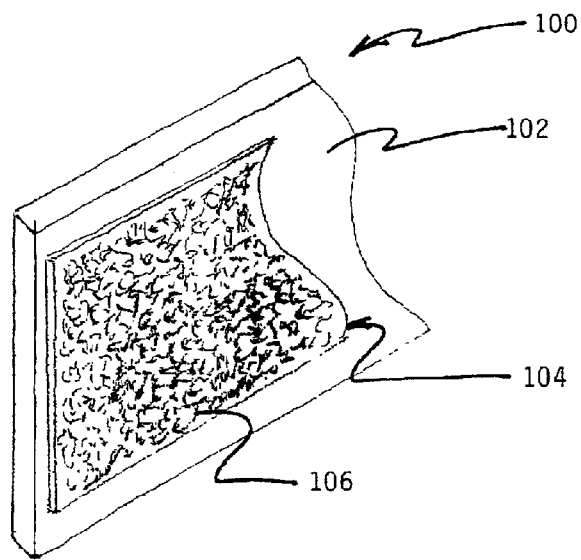
FIG. 1 is a partial perspective side view of an article of the subject invention having a surface for providing a substrate for receiving a no-slip surface.

Referring to FIGS. 1, and 2, an article 100 is shown having a surface which operates as a substrate 102 for receiving a no-slip surface 104 or surface treatment. In a preferred embodiment of the invention, the no-slip surface 104 is formed from a conventional thermographic powder 106, such as a granular thermoplastic resin, which is deposited along the substrate 102. The powdered substrate 102 is then subjected to heat sufficient to melt the powder 106 and adhere it onto the substrate 102.

Thermography is an established printing process and typically involves depositing particles of thermographic powder on a thin sheet or film material that has a powder adhering liquid, such as an ink, which can be of any color including clear, placed thereon in the form of a pattern or a printed image. The powder has the characteristic of melting under the effect of heat and of forming, after fusion, a film or a relief. Excess powder is removed, such as by suction or by air blast, to be recycled and the sheet or film material is then subjected to heat that fuses the powder adhering to the ink to the sheet of film material. After the powder is fused onto the sheet or film material, it is then cooled by passing through a cooler or by use of a blast of cool air which chills and solidifies the powder. Such suitable thermography processes and apparatus for placing powder adhering liquid in a selected pattern on a thin sheet or film material, depositing a thermographic powder thereon, and for heating and cooling the sheet or film material and powder are well known to those of ordinary skill in the art. However, until now, such apparatus and processes have not been used for forming a no-slip surface or applying a no-slip surface treatment to the surface of an article.

As shown in FIGS. 1 and 2, the thermographic process of the present invention begins with the step of selecting a pattern (step 110) and applying powder adhering liquid 108 (step 112) in a preselected pattern along the substrate 102. The adhering liquid 108 is formulated to adhere to various substrate material, such as plastics, like acyclic, acrylonitrile-butadiene-styrene, polycarbonates, and poly vinyl chlorides. One such adhering liquid is a multi-purpose thermographic ink such as sold under the trademark ZEPHYR JET No. 9000 by Summit Inks Corporation of Kansas City, Mo. Other adhering liquids, such as a fast drying thermographic enamel, such as sold by Sericol Inks of Kansas City, Mo., may also be used. The adhering liquid 108 is applied in a preselected pattern using a conventional silk screen process. The substrate 102 is then passed under a shaker (not shown) or other similar device (step 114) that deposits and agitates a quantity of thermographic powder 106 over the substrate 102 which adheres to the powder adhering liquid 108. The thermographic powder 106 is a powder conventionally used for thermographic printing and can be a opaque powder, such as a metallic powder or a pigmented powder, or a transparent powder or a colored transparent powder. Excess powder 106 is then removed (step 116) using a convention process such as by by suction or by air blast, to be recycled. The desired surface coefficient of friction (step 118) and the appropriate heating temperature and time (step 120) are selected and the substrate 102 is then passed through a conventional heating apparatus (not shown), such as a tunnel-type oven, where it is heated (step 122) to melt or soften and fuse the thermographic powder 106 onto the substrate 102. The substrate 102 and the fused thermographic powder 106 is then cooled (step 124) to reduce the likelihood of smearing the fused powder 106.

The fusing of the thermographic powder 106 to the substrate 102 is a critical part of the no-slip surface treatment. By selecting the appropriate amount of heat and the appropriate length of heating time, the resulting roughness of the no-slip surface can be varied to produce the desired surface coefficient of friction. For example, by reducing the heat and/or the amount of heating time to melt or soften and fuse the thermographic powder, the roughness and the corresponding surface coefficient of friction can be increased. By increasing the heat and/or the length of heating time to melt and fuse the thermographic powder, the corresponding surface coefficient of friction can be reduced. It should be understood that the specific combination of heat and time for a given application can be easily determined by one skilled in the art.

It should now be apparent to those skilled in the art that the no-slip surface and surface treatment of the present invention can be used for a large variety of applications including, but not limited to, containers, trays, coasters, tray supports, tools, measuring devices, instruments, and the like.

Figure 3:
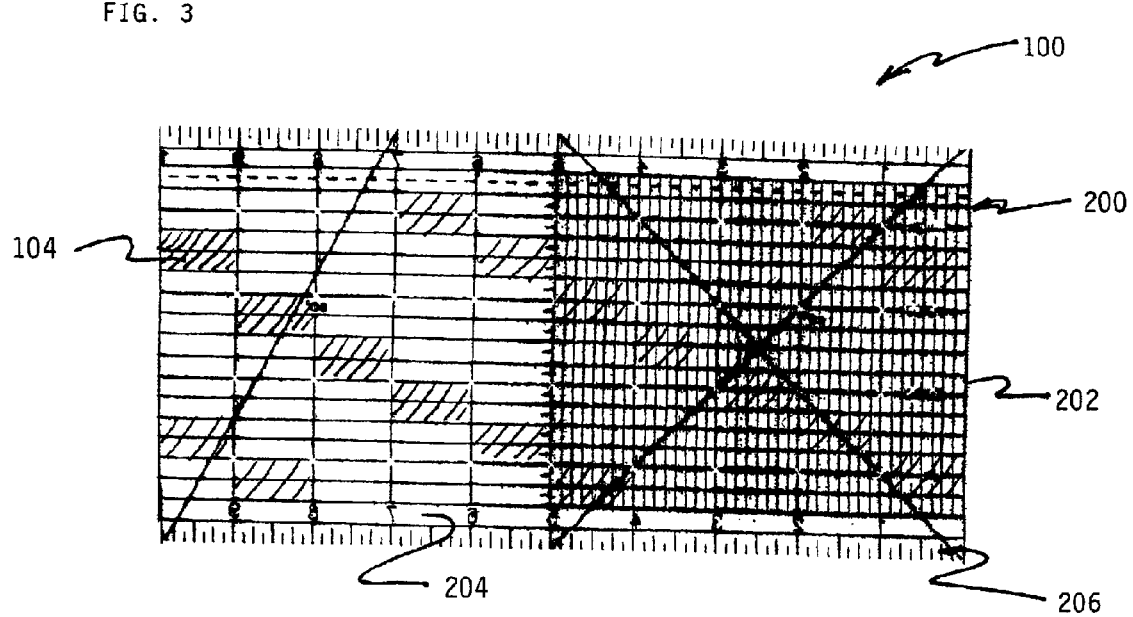
FIG. 3 is a bottom plan view of the article of FIG. 1, wherein the article being a measuring device.

Referring to FIG. 3, the article 100, as shown, is a measuring device 200 having a substantially thin and elongated planar shaped body 202 constructed preferably of a durable plasticized material having an upper face (not shown) and a lower face 204. The measuring device includes measurement indications 206 which may be printed on either the upper face or the lower face 204 or incorporated within the body 202. The lower face 204 operates as a substrate for receiving a no-slip surface 104, such as previously described herein, applied in a selected pattern to enable the user to maintain the measuring device 200 against the surface of the material or object being measured. It should now be understood to those skilled in the art that the use of a transparent powder adhering liquid and thermographic powder provides a no-slip surface that is transparent thereby not obstructing view of the user.

Figure 4:
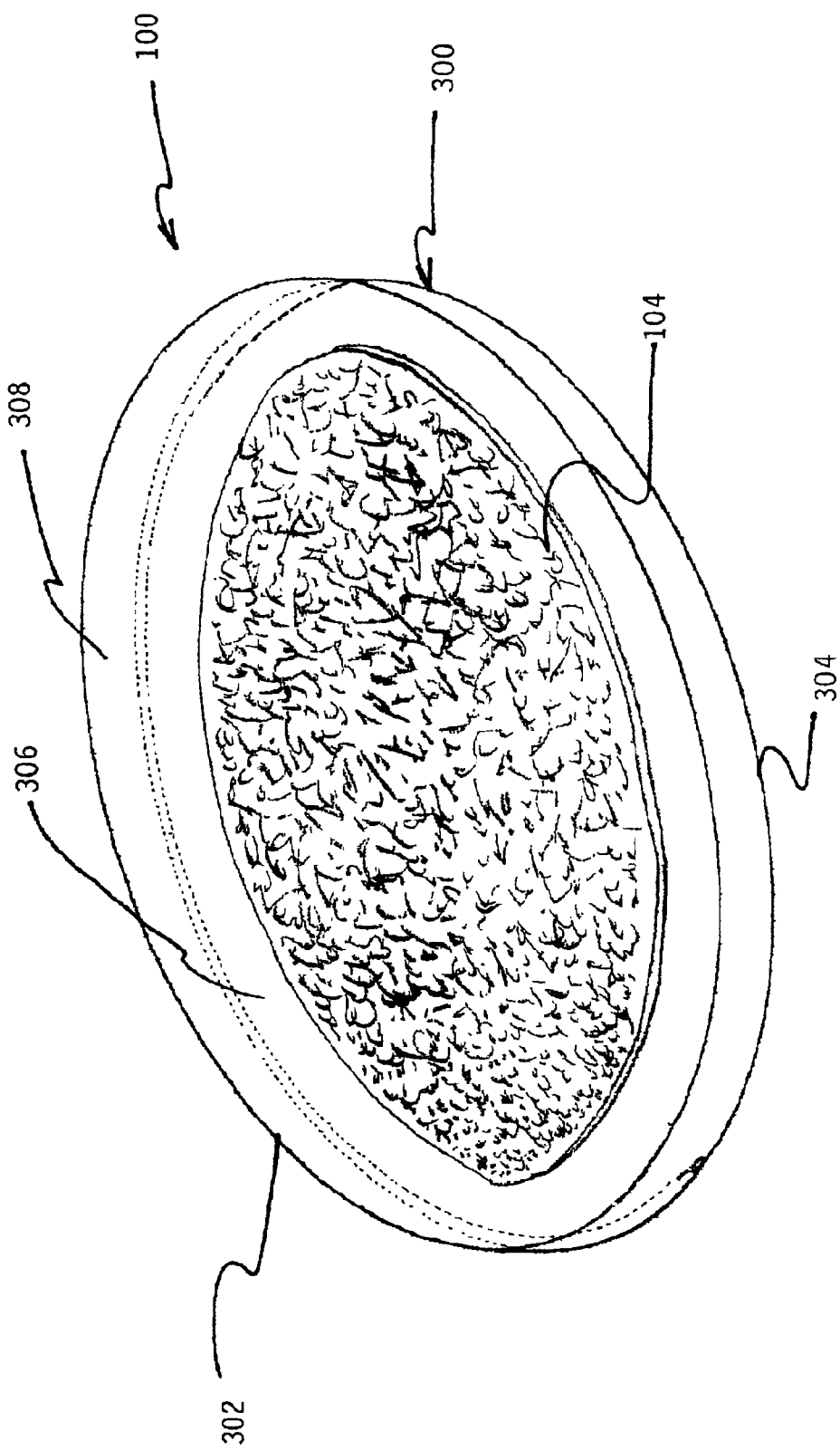
FIG. 4 is a bottom perspective view of the article of FIG. 1 wherein the article being a coaster or tray having a no-slip surface applied to its lower face.

Referring to FIG. 4, the article 100, as shown, is a coaster or tray 300 generally comprising a rounded base 302 having an upper 304 and a lower face 306 and a vertical projection or wall 308. The lower face 306 operates as a substrate for receiving a no-slip surface 104, such as previously described herein, which operates to prevent or hinder the coaster or tray from sliding along the surface of a support (not shown). It should now be understood to those skilled in the art that the no-slip surface can be applied to the surface of the coaster or tray in a selected pattern and color to provide a no-slip surface as well as a decorative appearance. It should also be understood that the no-slip surface can also be transparent so that it will not detract from the appearance of the coaster or tray.

Figure 5:
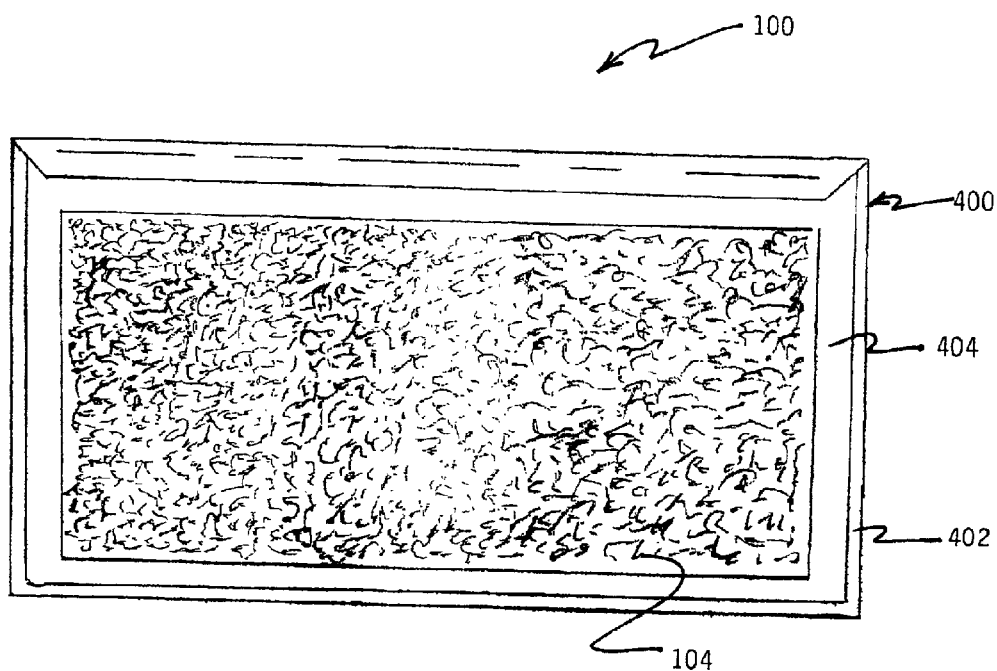
FIG. 5 is a top plan of the article of FIG. 1 wherein the article being a tray support having a no-slip surface applied to its upper face.

Referring to FIG. 5, the article 100, as shown, is a conventional tray support 400, such as conventionally used in passenger aircraft to support food trays, and generally comprises a rectangular base 402, having an upper 404 and a lower face (not shown). The upper face 404 operates as a substrate for receiving a no-slip surface 104, such as previously described herein. The no-slip surface 104 operates to prevent or hinder food trays, glasses, beverage containers, and the like, from sliding along the upper face 404 of the tray support 400.

Figure 6:
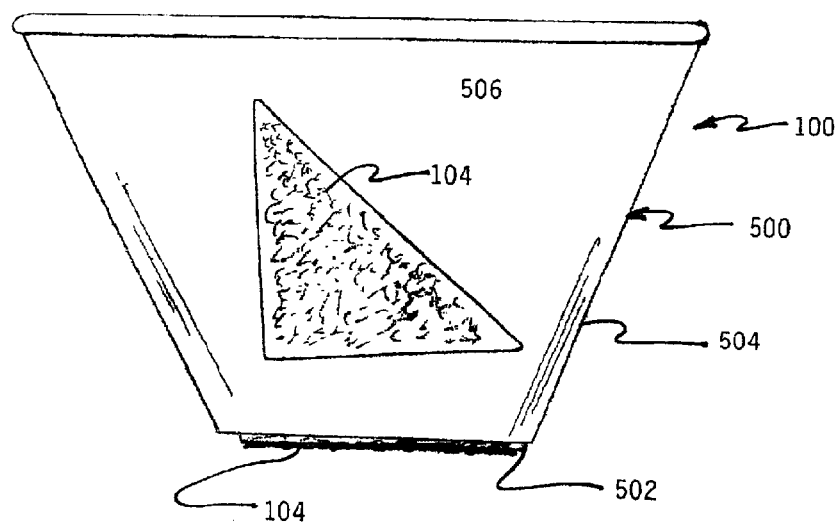
FIG. 6 is a side elevation view of the article of FIG. 1 wherein the article being a container and having a no-slip surface applied to the outer face of its vertically extending wall and to its bottom surface.

Referring to FIG. 6, the article 100, as shown, is a container 500, such as a beverage or food container, and comprises a bottom surface 502 and at least one vertically extending wall 504 having an outer face 506. The bottom surface 502 and the outer face 506 of the vertically extending wall 504 provide substrates for receiving a no-slip surface 104, such as previously described herein. It should be understood that the no-slip surfaces 104 can be used to reduce the likelihood that the container will slide along the support surface, such as when the support surface is not level, or slip out of the hand of a user when being held. It should now be understood to those skilled in the art that the no-slip surface can be applied to the surface of the container in a selected pattern and color to provide a no-slip surface as well as a decorative appearance. It should also be understood that the no-slip surface can also be transparent so that it will not detract from the appearance of the container.

Figure 7:
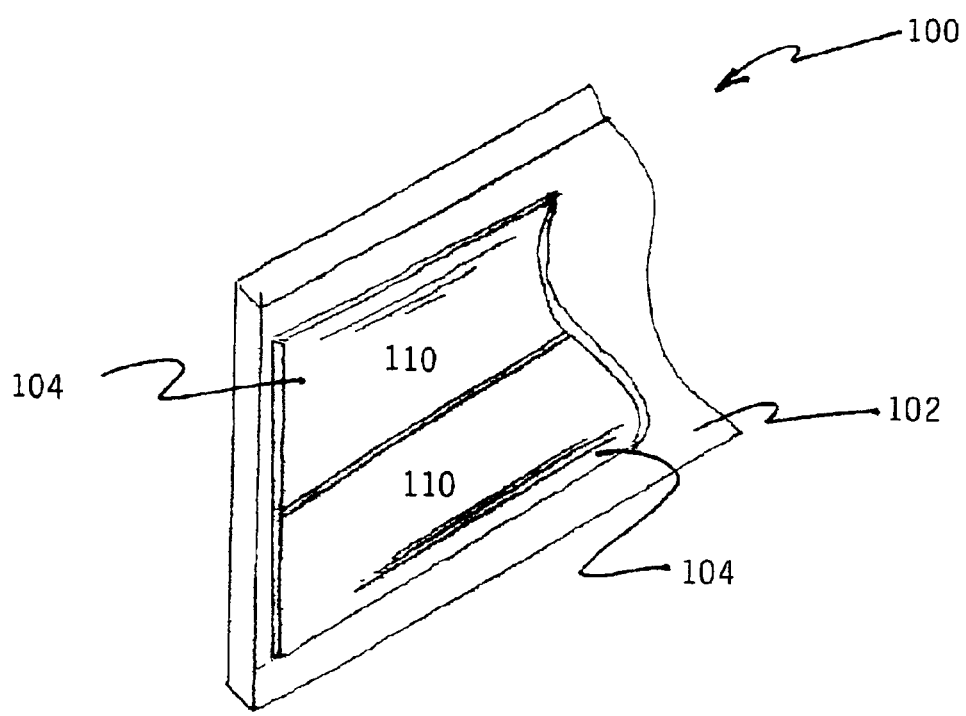
FIG. 7 is another preferred embodiment of the invention showing an article having a surface for performing as a substrate for receiving a no-slip surface or surface treatment formed from a static cling material.

Referring to FIG. 7, another preferred embodiment of the invention is shown and comprises an article 100 having a surface for receiving a no-slip surface 104 comprising a conventional static cling plastic material 110. The static cling material 110 can be opaque or transparent and can be in a variety of colors. The static cling material 110 can be placed along the surface 102 of the article 100 in the form of a plurality of dots or static cling pieces, strips, or sheets. It should now be understood that the use of such static cling material provides a removable no-slip surface effective for use on a variety of articles.

It should now be apparent to those skilled in the art that the present invention provides a no-slip surface or surface treatment for an article that can provide a non-slip coefficient of friction, that can be permanently attached to the article, that can be clear or transparent, that is easily applied, does not detrimentally detracting from the appearance of the article, and which is relatively cost effective for most applications.

I claim:

1. A method of applying a no-slip surface to a measuring device comprising the steps of:

applying an adhesive in a selected pattern along a surface of the measuring device;

applying a thermographic powder such that the thermographic powder adhered to the adhesive;

heating the thermographic powder to fuse the thermographic powder to the surface of the article and to form the no-slip surface.

2. The method of claim 1 wherein the thermographic powder forms a transparent no-slip surface.

3. The method of claim 1 wherein the thermographic powder forms a colored no-slip surface.

4. The method of claim 1 wherein the adhesive is applied using a silk screening process.

5. The method of claim 1 wherein the measuring device is a ruler for use in measuring fabric for cutting.

6. A method of applying a no-slip surface to a container comprising the steps of:

applying an adhesive in a selected pattern along a surface of the container;

applying a thermographic powder such that to thermographic powder adhered to the adhesive;

heating the thermographic powder to fuse the thermographic powder to the surface of the article and to form the no-slip surface.

7. The method of claim 1 wherein the container is a food container.

8. A method of applying a no-slip surface to an article comprising the steps of:

applying an adhesive in a selected pattern along a surface of the article;

applying a thermographic powder such that the thermographic powder adhered to the adhesive;

selecting the roughness of the no-slip surface which produces the desired surface coefficient of friction and heating the thermographic powder to the proper temperature and for the proper amount of time to form the no-slip surface having the desired surface coefficient of friction.

9. The method of claim 8 wherein the article is selected from the group consisting of measuring devices, trays, tray supports, tools, tool handles, containers, instruments and coasters.

10. The method of claim 8 whereby the powder adhering liquid is applied to the surface of the article using a silk screening process.

* * * * *